US009387931B2

(12) United States Patent
Himmelmann (10) Patent No.: US 9,387,931 B2
(45) Date of Patent: Jul. 12, 2016

(54) AIR CUSHION AIRCRAFT CARGO LOADING SYSTEMS AND SHUTTLE DRIVE UNIT (71) Applicant: Goodrich Corporation, Charlotte, NC (US)

(72) Inventor: Richard A. Himmelmann, Beloit, WI (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/512,113

(22) Filed: Oct. 10, 2014

(65) Prior Publication Data
US 2016/0101862 A1   Apr. 14, 2016

(51) Int. Cl.
B65G 53/44 (2006.01)
B64D 9/00 (2006.01)

(52) U.S. Cl.
CPC ............ B64D 9/00 (2013.01); B64D 2009/006 (2013.01)

(58) Field of Classification Search
CPC ............................... B65G 25/04; B65G 53/44
USPC ............. 198/468.9, 810.02, 810.03, 810.04; 700/229, 230; 406/78, 88; 414/676
See application file for complete search history.

(56) References Cited

U.S. PATENT DOCUMENTS

| 1,437,964 A | 12/1922 | Fitch |
| 3,055,446 A | 9/1962 | Vaughen |
| 3,190,460 A | 6/1965 | Rubin |
| 3,209,929 A | 10/1965 | Petersen et al. |
| 3,513,934 A | 5/1970 | Crowley |
| 3,597,117 A | 8/1971 | Zoehfeld |
| 3,756,544 A | 9/1973 | Bader |
| 3,773,391 A | 11/1973 | Crandall et al. |
| 3,809,268 A | 5/1974 | Lutz |
| 3,908,785 A | 9/1975 | Vaughen |
| 3,986,605 A | 10/1976 | Dooley et al. |
| 4,131,320 A | 12/1978 | Volat et al. |
| 4,139,071 A | 2/1979 | Tackett |
| 4,216,927 A | 8/1980 | Byrd |
| 4,353,457 A | 10/1982 | Haley |
| 4,354,796 A | 10/1982 | Bergman |
| 4,544,319 A | 10/1985 | Folling et al. |
| 4,600,169 A | 7/1986 | Koster et al. |
| 4,618,292 A | 10/1986 | Judge et al. |
| 4,676,699 A | 6/1987 | Leonov |

(Continued)

FOREIGN PATENT DOCUMENTS

| AU | 442872 | 11/1973 |
| BE | 723545 | 4/1969 |

(Continued)

OTHER PUBLICATIONS

Preinterview First Office Action dated Sep. 4, 2015 in U.S. Appl. No. 14/512,000.

(Continued)

Primary Examiner — Douglas Hess
(74) Attorney, Agent, or Firm — Snell & Wilmer L.L.P.

(57) ABSTRACT

A cargo management system is provided comprising a shuttle drive unit. The shuttle drive unit comprises a sheave, a pulley proximate the sheave comprising a groove of the pulley aligned with a groove of the sheave, and a motor configured to rotate the sheave. The cargo management system further comprises a belt coupled to the sheave and a cargo shuttle coupled to the belt.

14 Claims, 10 Drawing Sheets

(56) References Cited

U.S. PATENT DOCUMENTS

| | | | |
|---|---|---|---|
| 4,815,926 A | 3/1989 | Chaffee et al. | |
| 4,951,770 A | 8/1990 | Vaughen | |
| 5,137,367 A | 8/1992 | Madonia et al. | |
| 5,207,115 A * | 5/1993 | Takei | B23Q 5/34 108/137 |
| 5,311,973 A | 5/1994 | Tseng et al. | |
| 5,350,270 A | 9/1994 | Stallard et al. | |
| 5,634,636 A | 6/1997 | Jackson et al. | |
| 5,690,567 A * | 11/1997 | DeNijs | F16H 19/06 198/750.1 |
| 5,850,906 A * | 12/1998 | Dean | B65G 27/32 198/750.1 |
| 6,196,788 B1 | 3/2001 | Talbot et al. | |
| 6,427,947 B1 | 8/2002 | Rohrlick et al. | |
| 6,517,028 B2 | 2/2003 | Huber | |
| 6,630,633 B1 | 10/2003 | Uber et al. | |
| 7,073,994 B2 | 7/2006 | Huber et al. | |
| 7,108,474 B2 | 9/2006 | Moriya et al. | |
| 7,393,159 B2 | 7/2008 | Chang et al. | |
| 7,494,004 B2 * | 2/2009 | Stolyar | B65G 43/02 198/810.02 |
| 7,513,716 B2 | 4/2009 | Hayashi et al. | |
| 7,695,235 B1 | 4/2010 | Rallis | |
| 7,785,056 B2 | 8/2010 | Sanford et al. | |
| 7,800,009 B2 | 9/2010 | Gochar, Jr. | |
| 7,845,898 B2 | 12/2010 | Rawdon et al. | |
| 8,162,571 B2 | 4/2012 | Wada et al. | |
| 8,602,204 B2 * | 12/2013 | Yang | B23Q 7/1405 198/343.2 |
| 9,205,923 B1 * | 12/2015 | Himmelmann | B64D 9/00 |
| 9,284,130 B1 | 3/2016 | Himmelmann | |
| 9,290,270 B2 | 3/2016 | Himmelmann | |
| 2004/0241267 A1 | 12/2004 | Schultz | |
| 2008/0011119 A1 | 1/2008 | Bartosch | |
| 2008/0257692 A1 * | 10/2008 | Wallace | |
| 2009/0252568 A1 | 10/2009 | Morin | |
| 2011/0215198 A1 | 9/2011 | Panzram et al. | |
| 2013/0075065 A1 | 3/2013 | Degner et al. | |
| 2015/0225082 A1 | 8/2015 | Levron | |
| 2016/0052630 A1 | 2/2016 | Himmelmann | |
| 2016/0101857 A1 | 4/2016 | Himmelmann et al. | |
| 2016/0101858 A1 | 4/2016 | Himmelmann | |
| 2016/0101859 A1 | 4/2016 | Himmelmann | |
| 2016/0101860 A1 | 4/2016 | Himmelmann | |
| 2016/0101861 A1 | 4/2016 | Himmelmann | |
| 2016/0101863 A1 | 4/2016 | Himmelmann | |
| 2016/0101947 A1 | 4/2016 | Himmelmann | |

FOREIGN PATENT DOCUMENTS

| | | |
|---|---|---|
| CA | 903562 | 6/1972 |
| DE | 3440933 | 10/1985 |
| DE | 102008040751 | 1/2010 |
| DE | 102010035099 | 2/2012 |
| EP | 1547893 | 6/2005 |
| FR | 1360952 | 5/1964 |
| FR | 2340636 | 9/1977 |
| FR | 2448454 | 9/1980 |
| GB | 1210244 | 10/1970 |
| GB | 2182015 | 5/1987 |
| JP | 2000128322 | 5/2000 |
| WO | 8706909 | 11/1987 |
| WO | 8801975 | 3/1988 |
| WO | 9819940 | 5/1998 |
| WO | 0066463 | 11/2000 |
| WO | 2005028248 | 3/2005 |
| WO | 2005039036 | 4/2005 |
| WO | 2008091287 | 7/2008 |
| WO | 2014049590 | 4/2014 |

OTHER PUBLICATIONS

Notice of Allowance dated Oct. 19, 2015 in U.S. Appl. No. 14/512,000.
Notice of Allowance dated Nov. 13, 2015 in U.S. Appl. No. 14/464,323.
Office Action dated Nov. 17, 2015 in U.S. Appl. No. 14/511,559.
Corrected Notice of Allowability Jan. 7, 2016 in U.S. Appl. No. 14/464,323.
Notice of Allowance dated Jan. 20, 2016 in U.S. Appl. No. 14/511,553.
Extended European Search Report dated Feb. 9, 2016 in European Application No. 15181603.0.
Extended European Search Report dated Feb. 11, 2016 in European Application No. 15189145.4.
Extended European Search Report dated Feb. 18, 2016 in European Application No. 15189116.5.
Extended European Search Report dated Feb. 18, 2016 in European Application No. 15189127.2.
Extended European Search Report dated Feb. 19, 2016 in European Application No. 15189129.8.
Extended European Search Report dated Mar. 7, 2016 in European Application No. 15189114.0.
Extended European Search Report dated Mar. 11, 2016 in European Application No. 15189140.5.
Extended European Search Report dated Mar. 11, 2016 in European Application No. 15189107.4.
Extended European Search Report dated Mar. 11, 2016 in European Application No. 15189119.9.
Extended European Search Report dated Mar. 14, 2016 in European Application No. 15189121.5.
Extended European Search Report dated Mar. 16, 2016 in European Application No. 15189124.9.
Final Office Action dated Apr. 22, 2016 in U.S. Appl. No. 14/511,559.
Notice of Allowance dated Apr. 1, 2016 in U.S. Appl. No. 14/511,645.
Partial European Search Report dated Mar. 18, 2016 in European Application No. 15189110.8.

* cited by examiner

AIR CUSHION AIRCRAFT CARGO LOADING SYSTEMS AND SHUTTLE DRIVE UNIT

FIELD OF INVENTION

The present disclosure relates to aircraft cargo loading systems, and, more specifically, to a shuttle drive unit for moving cargo in an aircraft cargo loading system.

BACKGROUND

Conventional aircraft cargo systems typically include various tracks and rollers that span the length of an aircraft. Power drive units ("PDUs") convey cargo forward and aft along the aircraft on conveyance rollers which are attached to the aircraft floor structure. Cargo may be loaded from an aft position on an aircraft and conducted by the cargo system to a forward position and/or, depending upon aircraft configuration, cargo may be loaded from a forward position on an aircraft and conducted by the cargo system to an aft position. Conventional systems are typically designed to accommodate a particular pallet size. Conventional systems are typically comprised of numerous components that may be time consuming to install, replace and maintain.

SUMMARY

A cargo management system is provided comprising a shuttle drive unit. The shuttle drive unit comprises a spool, a pulley proximate the spool comprising a groove of the pulley aligned with a groove of the spool, and a motor configured to rotate the spool. The cargo management system further comprises a belt coupled to the spool and a cargo shuttle coupled to the belt.

In various embodiments, a rotary power module may be coupled to the spool. The rotary power module may be coupled to the spool through a slip ring assembly. The belt may include wires. A communications module may be coupled to the wire in the belt. A final gear reduction and spindle assembly may be coupled to the spool. The final gear reduction and spindle assembly may be disposed within an inner bore of the spool. A motor may be coupled to the final gear reduction and spindle assembly. The first shuttle drive unit may be configured to pull the cargo shuttle in an aft direction. A second belt may be coupled to the cargo shuttle with a second shuttle drive unit coupled to the second belt. The second shuttle drive unit may pull the cargo shuttle in a forward direction. The belt may be electrically coupled to a centrifugal air blower controller.

A shuttle drive unit may comprise a spool, a pulley proximate the spool, and a spindle assembly inside the spool. The spool may rotate around the spindle assembly. The shuttle drive unit may further comprise a motor mechanically coupled to the spindle assembly and a power and communication module coupled to the spool. A belt may be coupled to the spool. The motor may include a stator and a rotor around an outer diameter of the stator.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Aircraft cargo management systems as disclosed herein allow cargo to be loaded into an aircraft and positioned within the aircraft in a simple, elegant manner. In that regard, aircraft cargo management systems as disclosed herein may reduce part count and associated replacement/wear costs over time.

Figure 1:
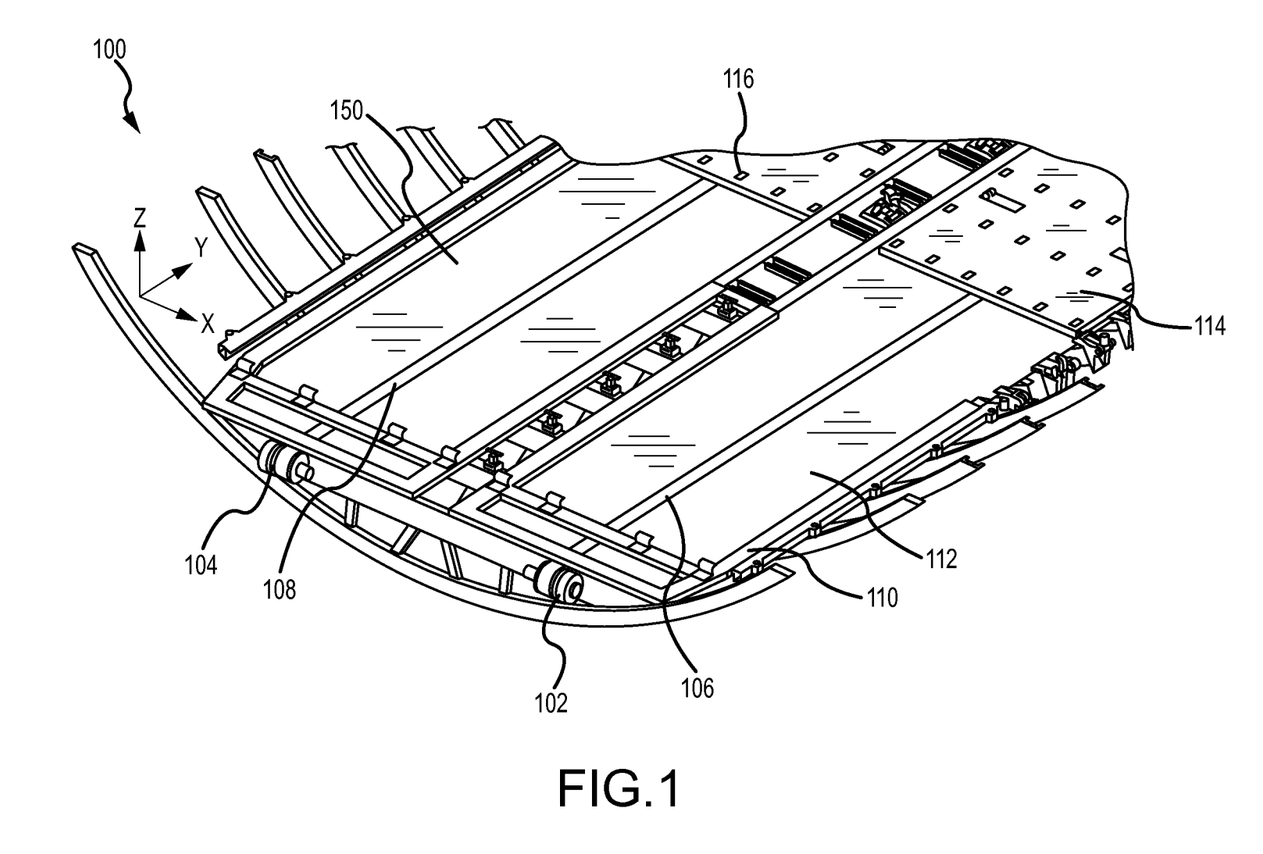
FIG. 1 illustrates a portion of a cargo management system, in accordance with various embodiments.
Figure 2:
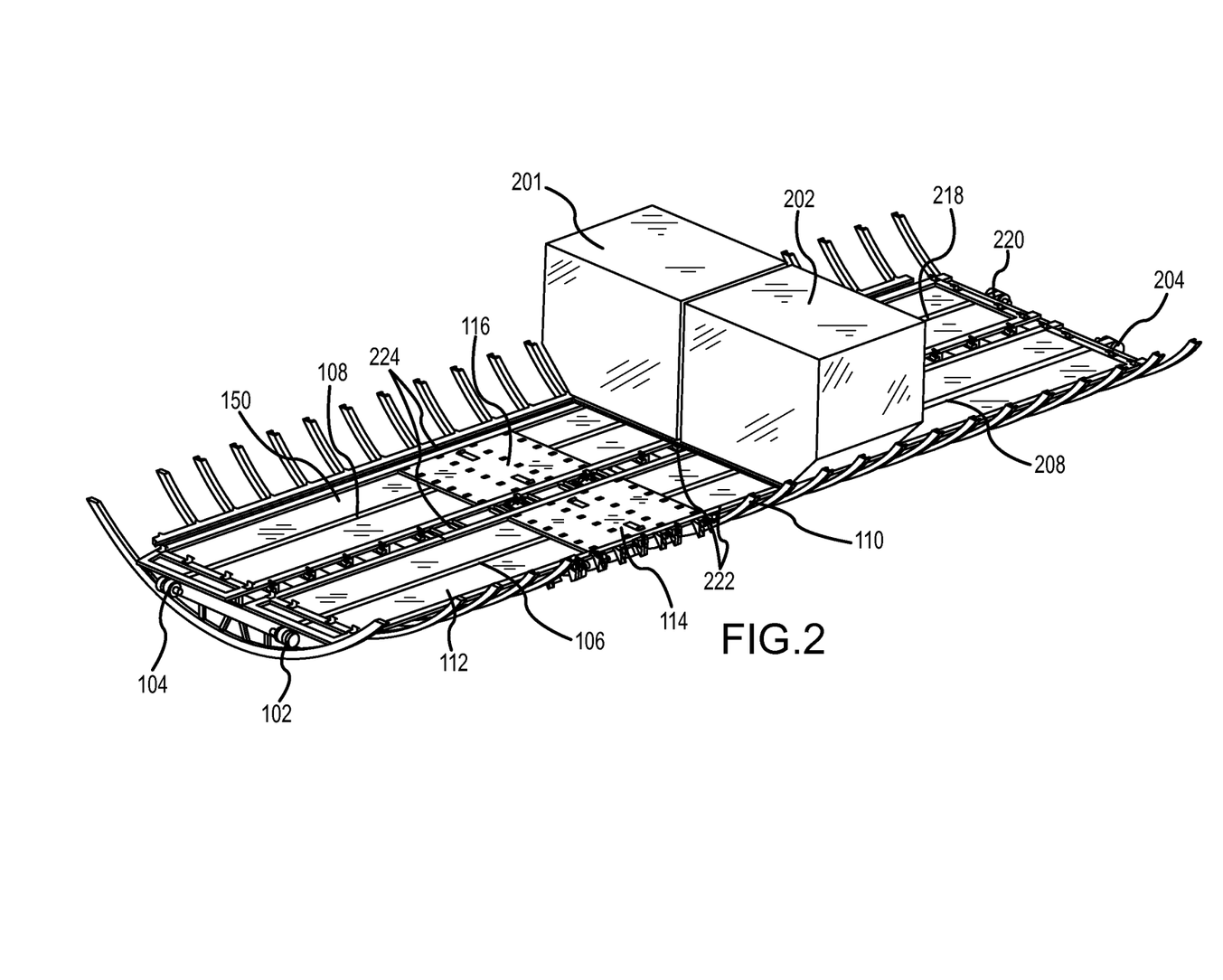
FIG. 2 illustrates a portion of a cargo management system, in accordance with various embodiments.

With reference to FIGS. 1 and 2 aircraft cargo management system 100 is illustrated using an x, y, and z axes for ease of illustration. Air cushion cargo shuttle 114 and 116 are shown forward of an aft portion of an aircraft. Air cushion cargo shuttle 114 is coupled to aft drive shuttle belt 106 and air cushion cargo shuttle 116 is coupled to aft drive shuttle belt 108. Aft drive shuttle belt 106 is coupled to aft shuttle drive unit 102. Aft drive shuttle belt 108 is coupled to aft shuttle drive unit 104. Floor panel 112 is shown beneath air cushion cargo shuttle 114. Floor panel 150 is shown beneath air cushion cargo shuttle 116. As used with respect to air cushion cargo shuttle 114 and 116, the term "beneath" may refer to the negative z direction. Support rails 222 and 224 are shown laterally adjacent to floor panels 112 and 150. Support rails 222 and 224 may be mounted to another aircraft component, such as an airframe, and may be capable of supporting the weight of cargo. Floor panel 112 may comprise at least one of a composite material or a metallic material.

Air cushion cargo shuttle 114 is coupled to forward drive shuttle belt 208 and air cushion cargo shuttle 116 is coupled to forward drive shuttle belt 218. Forward drive shuttle belt 208 is coupled to forward shuttle drive unit 204. Forward drive shuttle belt 218 is coupled to forward shuttle drive unit 220. Cargo 202 is shown as resting on support rails 222 and cargo 201 is shown as resting on support rails 224. Air cushion cargo shuttle 116 may be used to lift cargo 201 off support rails 224 and move cargo 201 forward or aft.

Forward drive shuttle belt 208, forward drive shuttle belt 218, aft drive shuttle belt 106, and aft drive shuttle belt 108 (collectively, a "shuttle belt") may comprise any suitable belt capable of pulling an air cushion cargo shuttle. For example, a shuttle belt may comprise a flat belt. In that regard, a flat shuttle belt may not occupy excess space along the z direction. For example, a shuttle belt may comprise a polyurethane coated belt that includes a communications and power bus. In that regard, the structural support and power/data functions are provided by a single shuttle belt structure. For example, in various embodiments, a shuttle belt may comprise steel wires oriented in parallel and coated with polyurethane to hold the steel wires together, provide anti-friction properties, and noise dampening properties. Among the steel wires may be copper wires or other wires that are capable of carrying an electrical current at any suitable voltage. In that regard, the shuttle belt may comprise one or more copper wires to carry high voltage power and/or low voltage electrical signals that may convey data.

The shuttle belts may be wound around a portion of forward shuttle drive unit 204, forward shuttle drive unit 220, aft shuttle drive unit 102 and aft shuttle drive unit 104 (collectively, "shuttle drive unit"). In that regard, a shuttle drive unit may comprise a cylindrical structure (e.g., a bobbin) to which a shuttle belt is affixed. The shuttle drive unit comprises a motive device, such as an electric motor, to rotate the bobbin in a desired direction. The shuttle drive unit may also disengage the electric motor or be otherwise geared to apply resistive force in such a manner so that the bobbin is allowed to rotate in a reverse direction. In various embodiments, the electric motor may provide the resistive force by providing negative torque to the gear system and regenerating power back to the aircraft power bus. Thus, as forward shuttle drive unit 204 may be rotating its bobbin to pull forward drive shuttle belt 208 forward, aft shuttle drive unit 102 may allow its bobbin to freely rotate in response to the force exerted by forward drive shuttle belt 208 through air cushion cargo shuttle 114. In like manner, as aft shuttle drive unit 102 may be rotating its bobbin to pull aft drive shuttle belt 106 aft, forward shuttle drive unit 204 may allow its bobbin to freely rotate in response to the force exerted by aft drive shuttle belt 106 through air cushion cargo shuttle 114.

Accordingly, as forward shuttle drive unit 220 may be rotating its bobbin to pull forward drive shuttle belt 218 forward, aft shuttle drive unit 104 may allow its bobbin to freely rotate in response to the force exerted by forward drive shuttle belt 218 through air cushion cargo shuttle 116. In like manner, as aft shuttle drive unit 104 may be rotating its bobbin to pull aft drive shuttle belt 108 aft, forward shuttle drive unit 220 may allow its bobbin to freely rotate in response to the force exerted by aft drive shuttle belt 108 through air cushion cargo shuttle 116.

Figure 3:
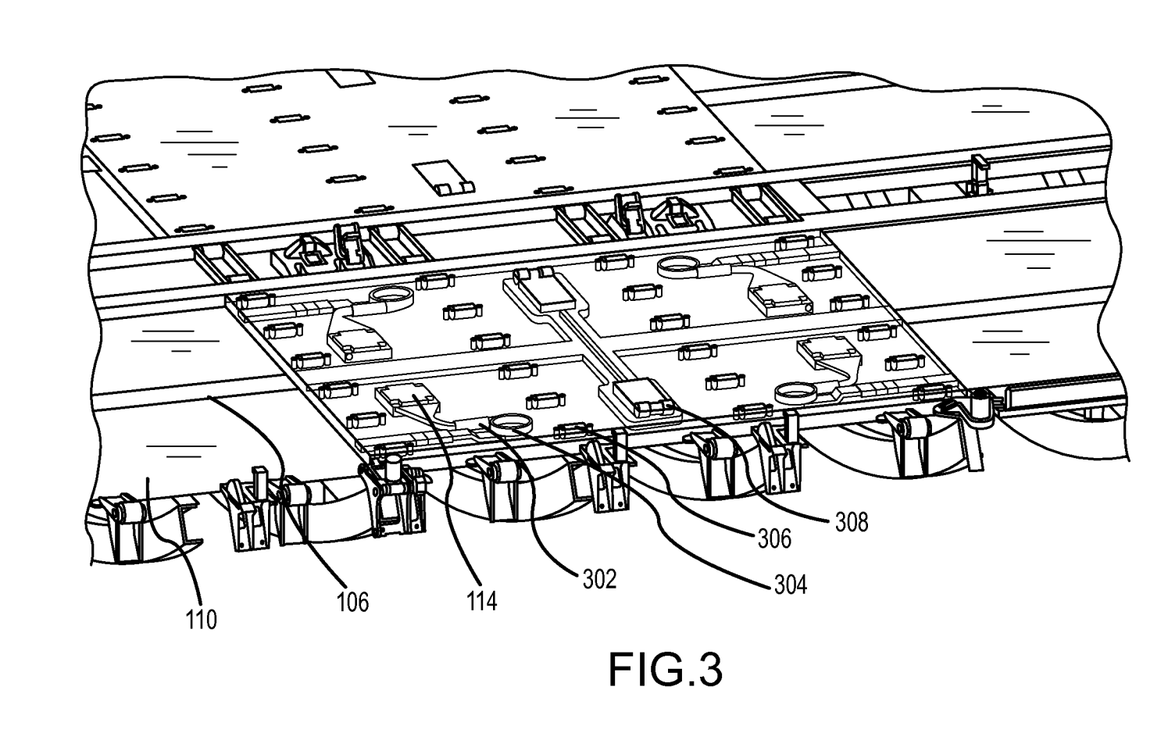
FIG. 3 illustrates a portion of a cargo management system, in accordance with various embodiments.
Figure 4:
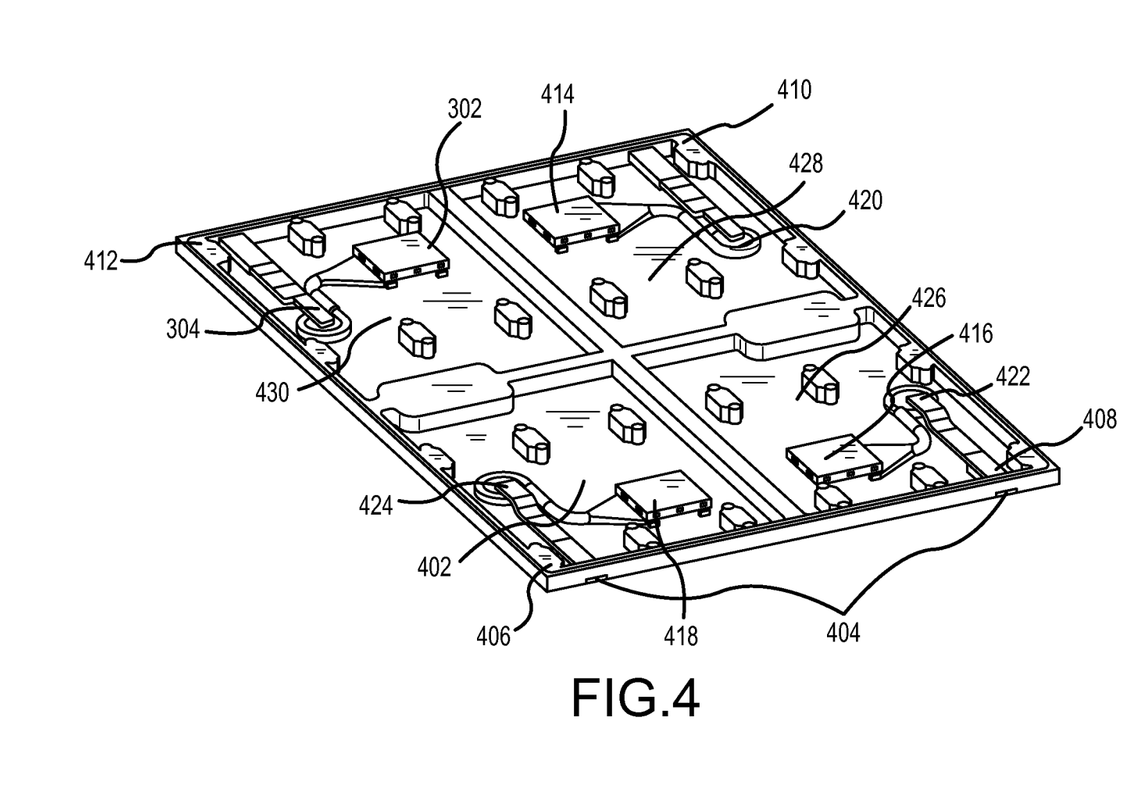
FIG. 4 illustrates the underside of an air cushion cargo shuttle guide assembly, in accordance with various embodiments.

With reference to FIGS. 3 and 4, air cushion cargo shuttle 114 is shown. It should be understood that air cushion cargo shuttle 116 is similarly structured and thus the features discussed herein relative to air cushion cargo shuttle 114 are also applicable to air cushion cargo shuttle 116. Power drive unit 308 and roller 306 are shown in air cushion cargo shuttle 114. Power drive unit 308 may drive cargo such as cargo 202, onto and off air cushion cargo shuttle 114. Roller 306 may facilitate movement of cargo 202 with respect to air cushion cargo shuttle 114.

Centrifugal air blower 304 is shown coupled beneath air cushion cargo shuttle 114. Air cushion cargo shuttle 114 may comprise one or more centrifugal air blowers.

Centrifugal air blower 304 is controlled by centrifugal air blower controller 302. Air cushion cargo shuttle 114 may comprise one or more centrifugal air blower controllers. In various embodiments, each centrifugal air blower has one associated centrifugal air blower controller, though in various embodiments one centrifugal air blower controller controls multiple centrifugal air blowers. Centrifugal air blower controller 302 may provide power and instructions to centrifugal air blower 304 to control how and when centrifugal air blower 304 operates. Centrifugal air blower 304 comprises inlets 404. Inlets 404 allow the centrifugal air blower 304 to receive air from outside volume 402 and deliver that air to volume 402. In various embodiments, each centrifugal air blower has one associated inlet, though in various embodiments one centrifugal air blower is associated with multiple inlets. In further embodiments, a single inlet may supply air to one or more centrifugal air blowers.

Volume 402 of air cushion cargo shuttle 114 is shown in fluid communication with an outlet of centrifugal air blower 304. In that regard, centrifugal air blower 304 may blow air beneath air cushion cargo shuttle 114 and, more specifically, into volume 402. Volume 402 is shown in proximity to floor panel 112.

As shown, air cushion cargo shuttle 114 has four centrifugal air blower controllers 302, 414, 416, and 418 driving four centrifugal air blowers 304, 420, 422, and 424 to blow air into four different volumes 402, 426, 428, and 430. Each centrifugal air blower controller may further comprise a proximity sensor that may be configured to measure the proximity of a portion of air cushion cargo shuttle 114 to floor panel 112. For example, proximity sensors 406, 408, 410 and 412 may be associated with each centrifugal air blower controller 302, 414, 416, and 418. Proximity sensors 406, 408, 410 and 412 may be used in a closed loop control mechanism to modulate the output of four centrifugal air blowers 304, 420, 422, and 424. In that regard, centrifugal air blower controllers 302, 414, 416, and 418 may command four centrifugal air blowers 304, 420, 422 to blow air into volumes 402, 426, 428, and 430 until the proximity sensors 406, 408, 410 and 412 indicate that a desired proximity has been reached.

Moreover, data from proximity sensors 406, 408, 410 and 412 may be used to detect and compensate for uneven cargo loads. For example, in the event cargo 202 shifts to one portion of air cushion cargo shuttle 114 or otherwise exerts more force on a portion of air cushion cargo shuttle 114 relative to another, data from proximity sensors 406, 408, 410 and 412 may detect that one portion of air cushion cargo shuttle 114 is not as far from floor panel 112 as one or more other portions of air cushion cargo shuttle 114. In that regard, where insufficient distance from floor panel 112 is achieved, a centrifugal air blower controller may command its associated centrifugal air blower to increase output to compensate for the uneven load.

In that regard, in operation, cargo such as cargo 202 may be loaded onto air cushion cargo shuttle 114 at an aft position, such as a position proximate aft shuttle drive unit 102. Cargo 202 may be positioned onto air cushion cargo shuttle 114 using power drive unit 308 and roller 306. During loading of cargo 202, air cushion cargo shuttle 114 may be in contact with floor panel 112. Once cargo 202 is suitably positioned on top of air cushion cargo shuttle 114 (where the phrase "on top" in this context may refer to distance across the positive z direction), a control system for centrifugal air blower controller 302 may instruct centrifugal air blower 304 to begin operation. In this manner, air from inlets 404 is pulled into centrifugal air blower 304 and centrifugal air blower 304 blows this air into volume 402. As more air is blown into volume 402, the increased air pressure may act to lift air cushion cargo shuttle 114 apart from floor panel 112. In this context, the phrase "lift apart" may refer to movement of air cushion cargo shuttle 114 in the positive z direction. In various embodiments, the pressure in volume 402 may reach between 1 psi (6.89 kPa) to 10 psi (68.9 kPa), between 2 psi (13.7 kPa) and 6 psi (41.3 kPa), and about 4 ps (27.5 kPa), where the term about in this context may refer to +/−0.5 psi (3.4 kPa).

A control system comprising, for example, a processor and a tangible, non-transitory memory may be configured to be in electrical and/or logical communication with centrifugal air blower controller 302. For example, the control system may communicate with centrifugal air blower controller 302 via one or more shuttle belts. The control system may instruct the centrifugal air blower controller 302 to start, stop, and modulate the output of centrifugal air blower 304.

During operation of centrifugal air blower 304, cargo 202 may lift apart from floor panel 112, thus reducing the friction between air cushion cargo shuttle 114 and the floor panel 112. Stated another way, dry friction may be equal to the coefficient of friction multiplied by the normal force. By eliminating the contact between air cushion cargo shuttle 114 and the floor panel 112, the two surfaces do not interact to cause friction. In various embodiments, there may be contact between air cushion cargo shuttle 114 and the floor panel 112 during operation of centrifugal air blower 304, though the air pressure will oppose the normal force (i.e., force in the negative z direction) exerted by cargo 202 and thus friction will be reduced because of this reduction in the normal force.

While cargo 202 is lifted apart from floor panel 112, the forward shuttle drive unit 204 may rotate its bobbin, causing forward drive shuttle belt 208 to pull air cushion cargo shuttle 114 and cargo 202 forward. Aft shuttle drive unit 104 may be allowed to exert a low level drag force on aft drive shuttle belt 108, thus allowing aft drive shuttle belt 108 to extend in a forward direction. A low level drag force exerted by aft shuttle drive unit 104 may prevent excessive cargo velocity and may maintain stability in the event an aircraft is not precisely level. Once cargo 202 is positioned in the aircraft at a desired position, the control system may instruct the centrifugal air blower controller 302 to turn off or lower the output of centrifugal air blower 304. In that regard, due to loss of air pressure in volume 402, air cushion cargo shuttle 114 may move in a negative z direction and contact floor panel 112. As air cushion cargo shuttle 114 moves towards floor panel 112, cargo 202 may come to rest on support rails 222. Thus, the air cushion cargo shuttle 114 may separate from the cargo 202 as the cargo 202 is restrained from motion in the negative z direction by support rails 222. In this manner, air cushion cargo shuttle 114 may be brought aft to load additional cargo. The aft shuttle drive unit 102 may rotate its bobbin, causing aft drive shuttle belt 108 to pull air cushion cargo shuttle 114 aft. Additional cargo may now be loaded and the process may proceed again.

Figure 5:
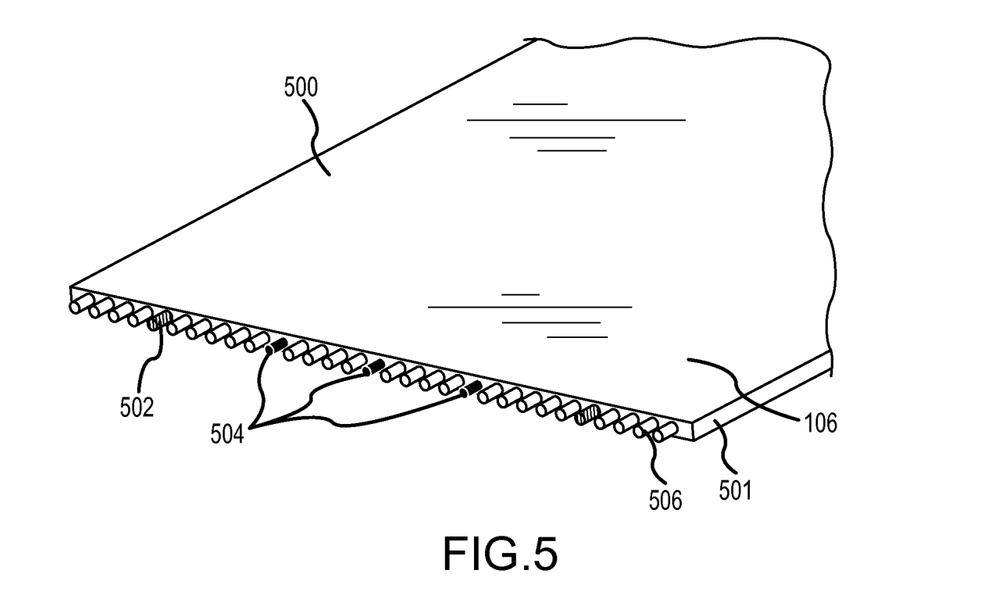
FIG. 5 illustrates a belt for use with a shuttle drive unit in a cargo management system, in accordance with various embodiments.

FIG. 5 illustrates a belt for use with a shuttle drive unit for a cargo management system, in accordance with various embodiments. Forward drive shuttle belt 208, forward drive shuttle belt 218, aft drive shuttle belt 106, and aft drive shuttle belt 108 may comprise a belt 500. Belt 500 may comprise one or more strengthening members (e.g., strands of steel and/or other metals or other suitable materials) to provide tensile strength so that belt 500 may pull a cargo shuttle unit without failure. Strengthening members 506 may comprise one or more metal strands, composite woven strands, or other high strength material for pulling heavy loads. Belt 500 may be flat and elongated to minimize volume when stored on, for example, a spool. Belt 500 may comprise a coated belt. Coating 501 may hold the strengthening members 506 together, provide anti-friction properties, and noise dampening properties. The coating may also hold power conduits 502, communication conduits 504 and strengthening members 506 together. Coating 501 may comprise any suitable insulating material. For example, various thermoplastics and/or thermosets may be suitable for use as a coating. In various embodiments, coating 501 comprises polyurethane. Belt 500 includes a communications and power bus. For example, belt 500 may comprise power conduits 502 within the coating 501. Belt 500 may also comprise communication conduits 504 within the coating 501. Communication conduits 504 and power conduits 502 may be between strengthening members 506.

In that regard, structural support and power/data functions are provided by belt 500. For example, in various embodiments, a shuttle belt may comprise strengthening members 506 that are steel wires oriented in parallel. Among the steel wires may be communication conduits 504 and power conduits 502 that are copper wires or other wires capable of carrying an electrical current at any suitable voltage. In that regard, the shuttle belt may comprise one or more copper wires to carry high voltage power and/or low voltage electrical signals that may convey data.

Figure 6A:
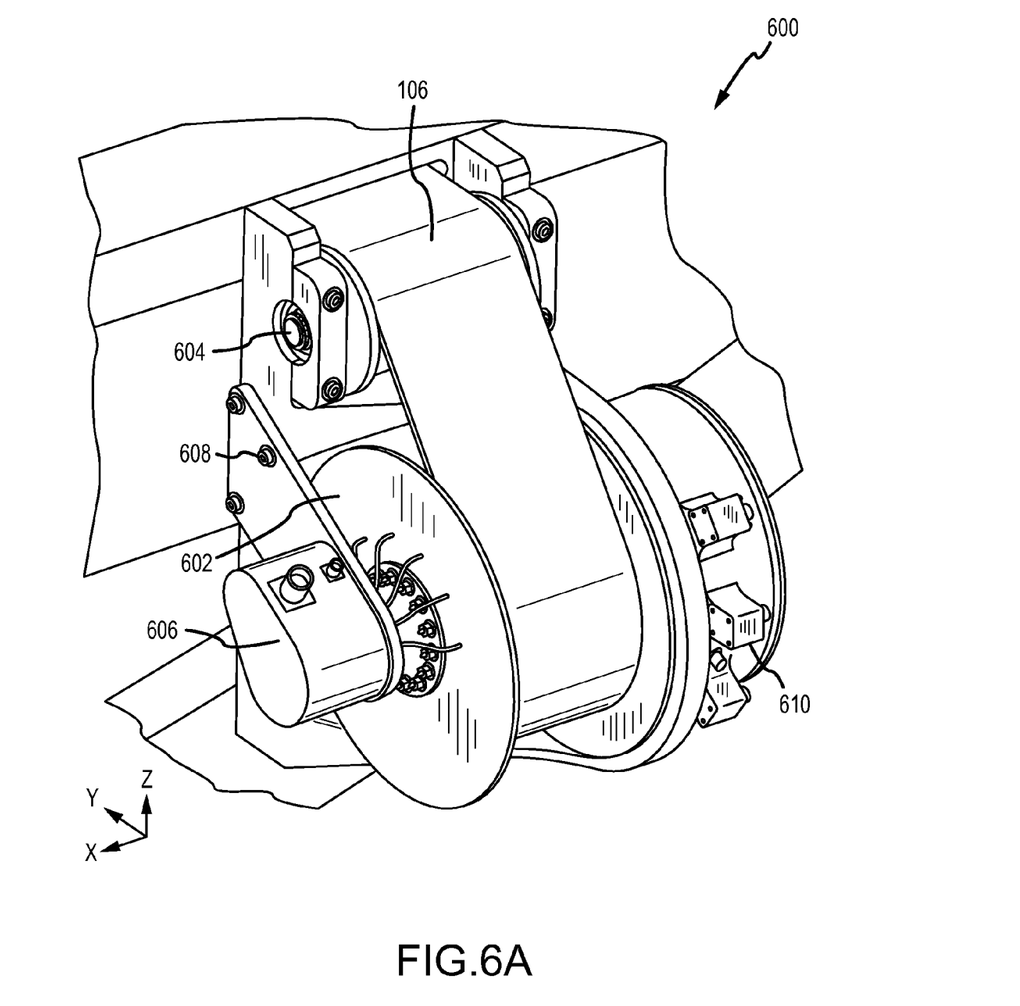
FIG. 6A illustrates a shuttle drive unit powering a cargo management system, in accordance with various embodiments.
Figure 6B:
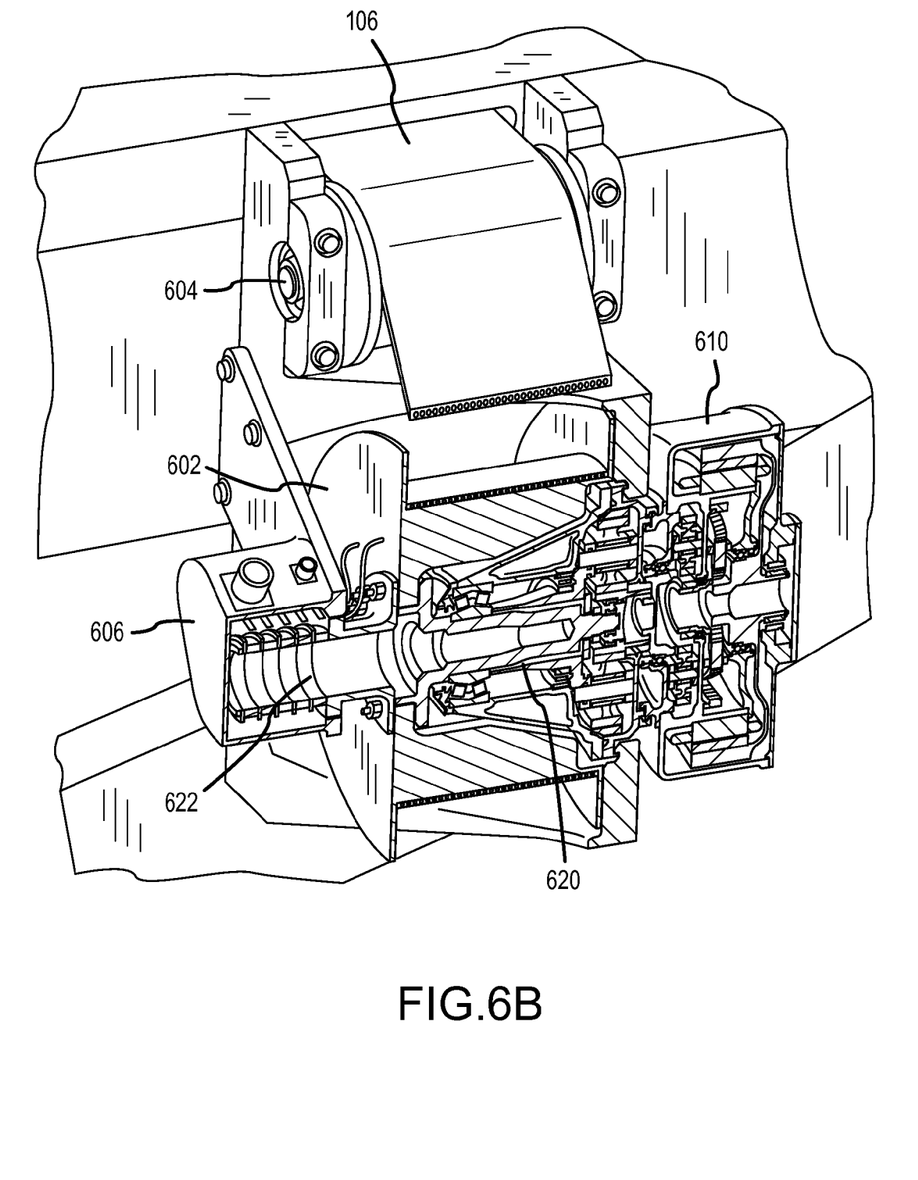
FIG. 6B illustrates a cutaway of a shuttle drive unit powering a cargo management system, in accordance with various embodiments.

With regard to FIGS. 6A and 6B, belt 500 may attach to shuttle drive assembly 600. Shuttle drive assembly as shown in FIGS. 6A and 6B illustrates shuttle drive unit 102 in greater detail. Shuttle drive assembly 600 may comprise a spool 602 to which a belt 500 is coupled. As used herein, a spool is interchangeable with a bobbin or sheave. Shuttle drive assembly 600 comprises a motive device 610, such as an electric motor, pneumatic motor, hydraulic motor, or manual crank to rotate the bobbin in a desired direction. Shuttle drive assembly 600 may also disengage the motive device 610 or be otherwise geared in such a manner so that free rotation of spool 602 is allowed.

Shuttle drive assembly 600 may further comprise pulley 604. A groove of pulley 604 may be aligned with a groove of spool 602 so that belt 500 may turn around pulley 604 lying flat and also wind flat on spool 602. Pulley 604 may be substantially aligned in the z direction with an air cushion cargo shuttle so that belt 500 coupled to the air cushion cargo shuttle is substantially parallel to floor panel 112. Rotary power and communications module 606 may also be coupled to spool 602. Rotary power and communications module 606 may comprise a slip ring, inductive communications coupling, or other rotary to stationary power transfer device to electrically couple a static portion of rotary power and communications module 606 with rotating spool 602. An inductive power transfer assembly may also couple a static portion of rotary power and communications module 606 with rotating spool 602. In that regard, channels carried by power conduits 502 and communication conduits 504 may be transferred from the static reference frame to the rotating reference frame. Mounts 608 may provide structural support for shuttle drive assembly 600 and fix shuttle drive assembly 600 in place relative to the mounting point. Rotary power and communications module 606 may comprise a slip ring assembly 622. Final gear reduction and spindle assembly 620 may be fixed inside spool 602 so that spool 602 rotates around final gear reduction and spindle assembly 620 in response to rotational force provided by motive device 610. Motive device 610 may be mechanically coupled to final gear reduction and spindle assembly 620.

Figure 7:
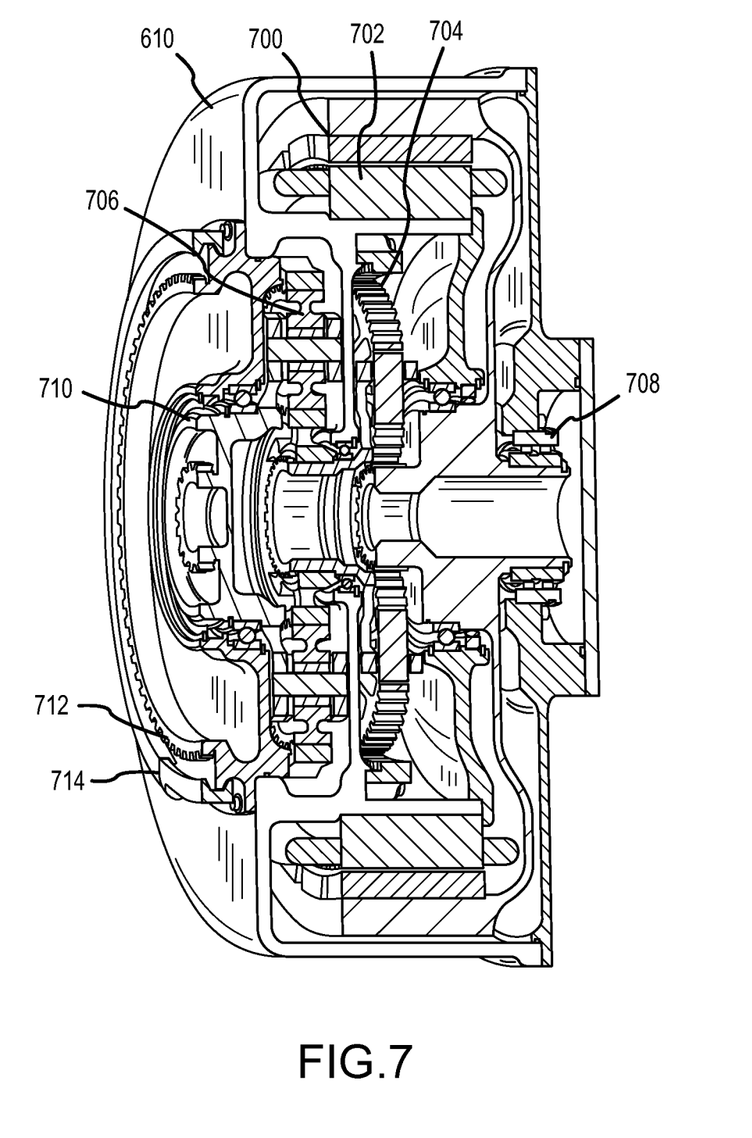
FIG. 7 illustrates a primary gear reduction and motor assembly, in accordance with various embodiments.

With reference to FIG. 7, motive device 610 (e.g., an AC motor, a DC motor, or other primary gear reduction and motor assembly) is shown. Motive device 610 provides motive force to rotate spool 602 of FIG. 6A. Motor rotor assembly 700 is inside an outer casing of motive device 610. Motor stator assembly 702 may be radially inward from motor rotor assembly 700 so that motor rotor assembly 700 is around an outer diameter of motor stator assembly 702. Stage 1 gear reduction 704 may be mechanically coupled to the motor rotor assembly. Stage 2 gear reduction 706 may be mechanically coupled to stage 1 gear reduction 704. Output shaft 710 is mechanically coupled to stage 2 gear reduction 706. Motive device 610 further includes motor resolver 708, motor torque reaction spline 712, and motor mounting v-band clamp 714.

Figure 8:
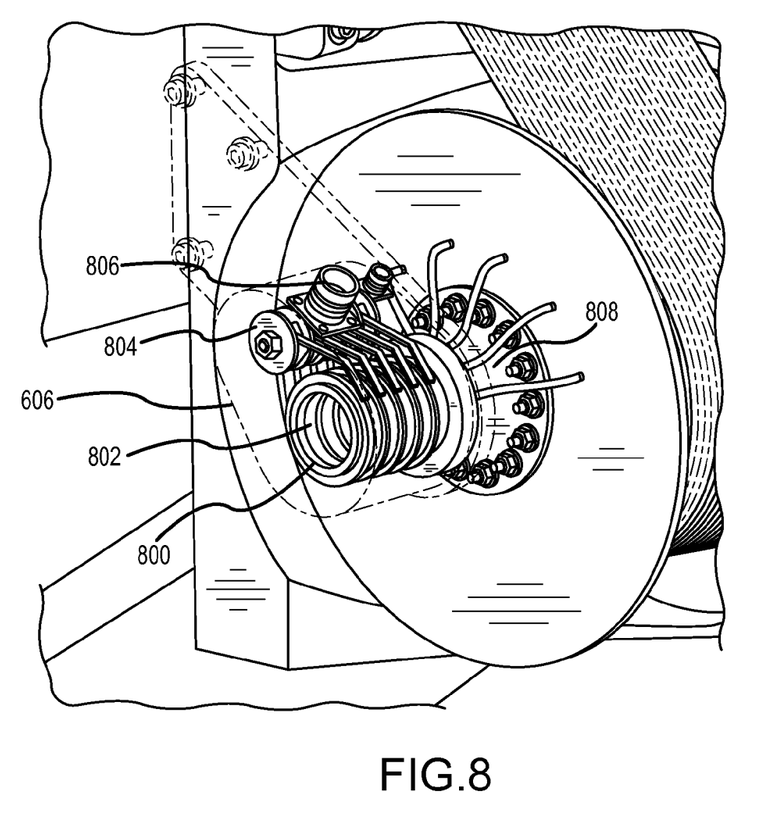
FIG. 8 illustrates a slip ring electrically coupling a static component with a rotating component, in accordance with various embodiments.

With reference to FIG. 8, communications module 606 is shown. Slip ring assembly 622 may pass signals to and from spool 602, which may be connected to power conduits 502 and communication conduits 504 of belt 500 of FIG. 5, to electrically couple rotating components with static components. Slip ring assembly 622 includes cylindrical interface 800 with circular contacts 802 around a circumference of cylindrical interface 800. Brush assembly 804 comprises carbon contacts pressing against cylindrical interface 800 and electrically coupled to circular contacts 802. Terminal 806 may provide for input and output of signals from spool 602 to static components. Leads 808 may be electrically connected to power conduits 502 and communication conduits 504 of belt 500. Leads 808 may rotate with spool 602 and cylindrical interface 800. Slip ring assembly 622 may comprise any type of rotary to stationary power transfer device (e.g., woven wire brushes, liquid metal contacts, ion in solution contacts, and inductive devices).

Figure 9:
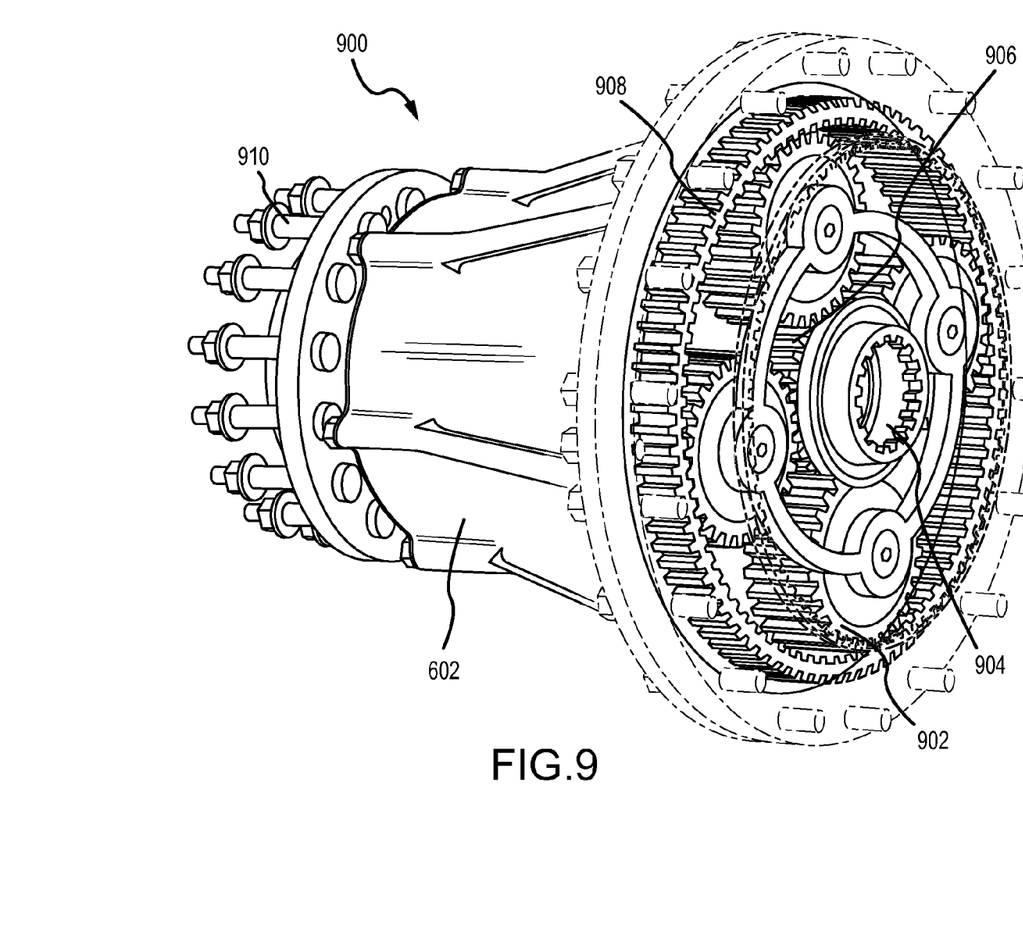
FIG. 9 illustrates a final gear reduction and spindle assembly, in accordance with various embodiments.

With reference to FIG. 9, final gear reduction and spindle assembly 620 is shown, in accordance with various embodiments. Final gear reduction and spindle assembly 620 comprises drive input 904 to mechanically couple to output shaft 710 of motive device 610 in FIG. 7. Drive input 904 may be mechanically coupled to gears 906 and 908 to rotate in response to input from output shaft 710 of motive device 610. Outer case 902 of final gear reduction and spindle assembly 620 may be coupled to spool 602 with outer case 902 fastened to a wall of spool 602 by fasteners 910.

Shuttle drive assembly 600 provides motive force for air cushion cargo shuttles of a cargo management system. Shuttle drive assembly 600 may provide power and communication to the cargo management system to communicate with centrifugal air blower controller 302 and other electronics on air cushion cargo shuttles. Thus, shuttle drive assembly 600 may enable loading and unloading by pulling air cushion cargo shuttles in response to input commands.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cargo management system comprising:
   a shuttle drive unit comprising:
      a spool;
      a pulley proximate the spool comprising a groove of the pulley aligned with a groove of the spool; and
      a motor configured to rotate the spool;
   a belt coupled to the spool; and
   a cargo shuttle coupled to the belt.

2. The shuttle drive unit of claim 1, further comprising a rotary power module coupled to the spool.

3. The shuttle drive unit of claim 2, wherein the rotary power module is coupled to the spool through a slip ring assembly.

4. The shuttle drive unit of claim 1, wherein the belt further comprises at least one of a strengthening member, power conduit, or communication conduit.

5. The shuttle drive unit of claim 1, further comprising a communications module coupled to at least one of a communication conduit or a power conduit of the belt.

6. The shuttle drive unit of claim 1, further comprising a spindle assembly coupled to the spool.

7. The shuttle drive unit of claim 6, wherein the spindle assembly is disposed within an inner bore of the spool.

8. The shuttle drive unit of claim 6, wherein the motor is coupled to the spindle assembly.

9. The shuttle drive unit of claim 1, wherein the shuttle drive unit is configured to pull the cargo shuttle in an aft direction.

10. The shuttle drive unit of claim 9, further comprising:
    a second belt coupled to the cargo shuttle;
    a second shuttle drive unit coupled to the second belt.

11. The shuttle drive unit of claim 10, wherein the second shuttle drive unit is configured to pull the cargo shuttle in a forward direction.

12. The shuttle drive unit of claim 1, wherein the belt is electrically coupled to a centrifugal air blower controller.

13. A shuttle drive unit comprising:
    a sheave;
    a pulley proximate the sheave;
    a spindle assembly inside the sheave, wherein the sheave is configured to rotate around the spindle assembly;
    a motor mechanically coupled to the spindle assembly;
    a power and communication module coupled to the sheave; and a belt coupled to the sheave, wherein the belt is in electronic communication with the power and communication module.

14. The shuttle drive unit of claim 13, wherein the motor comprises:
    a stator; and
    a rotor around an outer diameter of the stator.

* * * * *